(12) United States Patent
Gregorat

(10) Patent No.: US 7,143,092 B1
(45) Date of Patent: Nov. 28, 2006

(54) DATA SYNCHRONIZATION SYSTEM AND METHOD OF OPERATION

(75) Inventor: Sandro Gregorat, Dallas, TX (US)

(73) Assignee: Samsung Electronics Co., Ltd., Suwon (KR)

( * ) Notice: Subject to any disclaimer, the term of this patent is extended or adjusted under 35 U.S.C. 154(b) by 609 days.

(21) Appl. No.: 09/461,072

(22) Filed: Dec. 14, 1999

(51) Int. Cl.
G06F 17/30 (2006.01)

(52) U.S. Cl. .................. 707/8; 707/201; 707/202; 707/203; 707/204; 715/500.1

(58) Field of Classification Search ........ 707/201–203, 707/204, 8; 715/500.1
See application file for complete search history.

(56) References Cited

U.S. PATENT DOCUMENTS

| | | | |
|---|---|---|---|
| 5,721,915 A * | 2/1998 | Sockut et al. ............... | 707/200 |
| 5,742,815 A * | 4/1998 | Stern ...................... | 707/103 R |
| 5,781,908 A * | 7/1998 | Williams et al. ............ | 707/104 |
| 5,926,816 A * | 7/1999 | Bauer et al. ................ | 707/8 |
| 5,978,813 A * | 11/1999 | Foltz et al. ................ | 707/201 |
| 6,026,412 A * | 2/2000 | Sockut et al. ............... | 707/200 |
| 6,070,170 A * | 5/2000 | Friske et al. ............... | 707/202 |
| 6,243,715 B1 * | 6/2001 | Bogantz et al. ............. | 707/201 |
| 6,289,357 B1 * | 9/2001 | Parker ...................... | 707/202 |
| 6,411,964 B1 * | 6/2002 | Iyer et al. .................. | 707/200 |
| 6,519,613 B1 * | 2/2003 | Friske et al. ............... | 707/202 |
| 6,886,012 B1 * | 4/2005 | Phoenix et al. .............. | 707/8 |
| 2004/0015468 A1* | 1/2004 | Beier et al. ................ | 707/1 |
| 2004/0015469 A1* | 1/2004 | Beier et al. ................ | 707/1 |

OTHER PUBLICATIONS

Levy et al, "A Formal Approach to Recovery by Compensating Transactions", 1990.*

* cited by examiner

*Primary Examiner*—Frantz Coby
*Assistant Examiner*—CamLinh Nguyen

(57) ABSTRACT

There is disclosed a data synchronization apparatus for maintaining synchronization between a source data file and a copy data file. The data synchronization apparatus comprises: 1) a bulk copy controller for copying a plurality of data records from the source data file to the copy data file; and 2) an update controller for detecting a change in a data record previously copied by the bulk copy controller from the source data file to the copy data file and copying the changed data record from the source data file to the copy data file.

21 Claims, 3 Drawing Sheets

DATA SYNCHRONIZATION SYSTEM AND METHOD OF OPERATION

TECHNICAL FIELD OF THE INVENTION

The present invention is directed, in general, to redundant data processing systems, more specifically, to a system for achieving and maintaining synchronization between the data in a source data file and a copy data file.

BACKGROUND OF THE INVENTION

Information systems have evolved from centralized mainframe computer systems supporting a large number of users to distributed computer systems based on local area network (LAN) architectures. As the cost-to-processing-power ratios for computer workstations, network servers, telephone switching equipment, wireless communication devices, and the like, have dropped precipitously, wireline and wireless LAN systems have proved to be highly cost effective. As a result, the number of LANs and LAN-based applications has exploded.

To enhance the reliability of modern information systems (IS), it is common practice to build IS components as redundant devices. For example, network switches, routers, wireless base stations, and the like, may contain a primary (also called "master" or "active") processing system that ordinarily performs the data processing functions of the device and a secondary (also called "slave" or "standby") processing system that takes over from the primary processing system upon a failure or upon the occurrence of certain selected events. To properly transfer control from the primary processing system to the secondary processing system, the data file used by the primary processing system (called "source" or "original" data file) must constantly be copied to the data file used by the secondary processing system (called "copy" or "image" data file) after recovery from the failure.

The prior art redundant processing systems typically accomplish this by means of a first bulk copy run that copies everything in the source data file to the copy data file. Then, a second bulk copy run is performed that copies to the copy data file only that data in the source data file that changed during the first copy run. This procedure is repeated until a single copy pass ends without any data changing. Thereafter, a realtime update process is used to copy each change in the source data file to the copy data file as each change occurs in the source data file. However, the duration and efficiency of the above-described procedure is greatly dependent on the rate at which data changes in the source data file. If data changes frequently, it is difficult to determine when the bulk copy will be completed so that the real time update process can take over.

There is therefore a need in the art for an improved redundancy architecture for use in a communication network. More particularly, there is a need in the art for an improved data synchronization system that synchronizes the data in a source data file and the data in a copy data file in a rapid and deterministic manner.

SUMMARY OF THE INVENTION

To address the above-discussed deficiencies of the prior art, it is a primary object of the present invention to provide a data synchronization apparatus for maintaining synchronization between a source data file and a copy data file. In an advantageous embodiment of the present invention, the data synchronization apparatus comprises: 1) a bulk copy controller capable of copying a plurality of data records from the source data file to the copy data file; and 2) an update controller capable of detecting a change in a data record previously copied by the bulk copy controller from the source data file to the copy data file and copying the changed data record from the source data file to the copy data file.

According to one embodiment of the present invention, the update controller and the bulk copy controller operate substantially concurrently, yet mutually exclusively to guarantee data consistency.

According to another embodiment of the present invention, the source data file comprises at least one data table comprising a plurality of data records and a synchronization descriptor associated with the at least one data table.

According to still another embodiment of the present invention, the bulk copy controller sequentially copies the plurality of data records in the at least one data table in the source data file to the copy data file and sets the synchronization descriptor to an index value of a most recently copied one of the plurality of data records.

According to yet another embodiment of the present invention, the update controller detects changes in the plurality of data records in the at least one data table in the source data file by monitoring selected ones of the plurality of data records in the at least one data table in the source data file having an index value less than the index value in the synchronization descriptor.

According to a further embodiment of the present invention, the update controller detects the changes in the plurality of data records in the at least one data table in the source data file by monitoring data write operations in the plurality of data records in the at least one data table in the source data file.

According to a yet further embodiment of the present invention, the update controller is capable of detecting that the copy data file is off line and has lost synchronization with the source data file and is capable of suspending the update process.

According to a still further embodiment of the present invention, the update controller is capable of determining that the copy data file is on line and is capable of activating the bulk copy controller by setting at least one synchronization descriptor in the source data file to a zero value.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
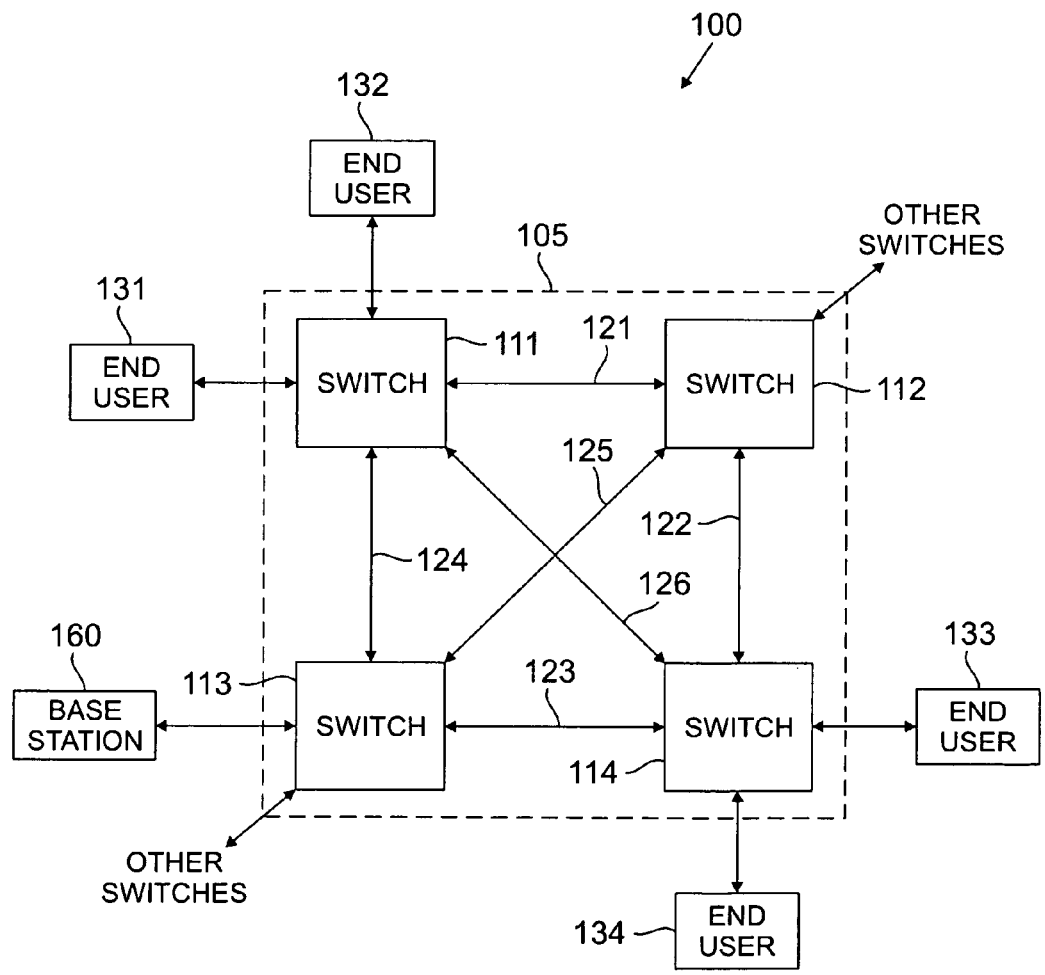
FIG. 1 illustrates an exemplary switching network containing redundant switches in accordance with the principles of the present invention.
Figure 2:
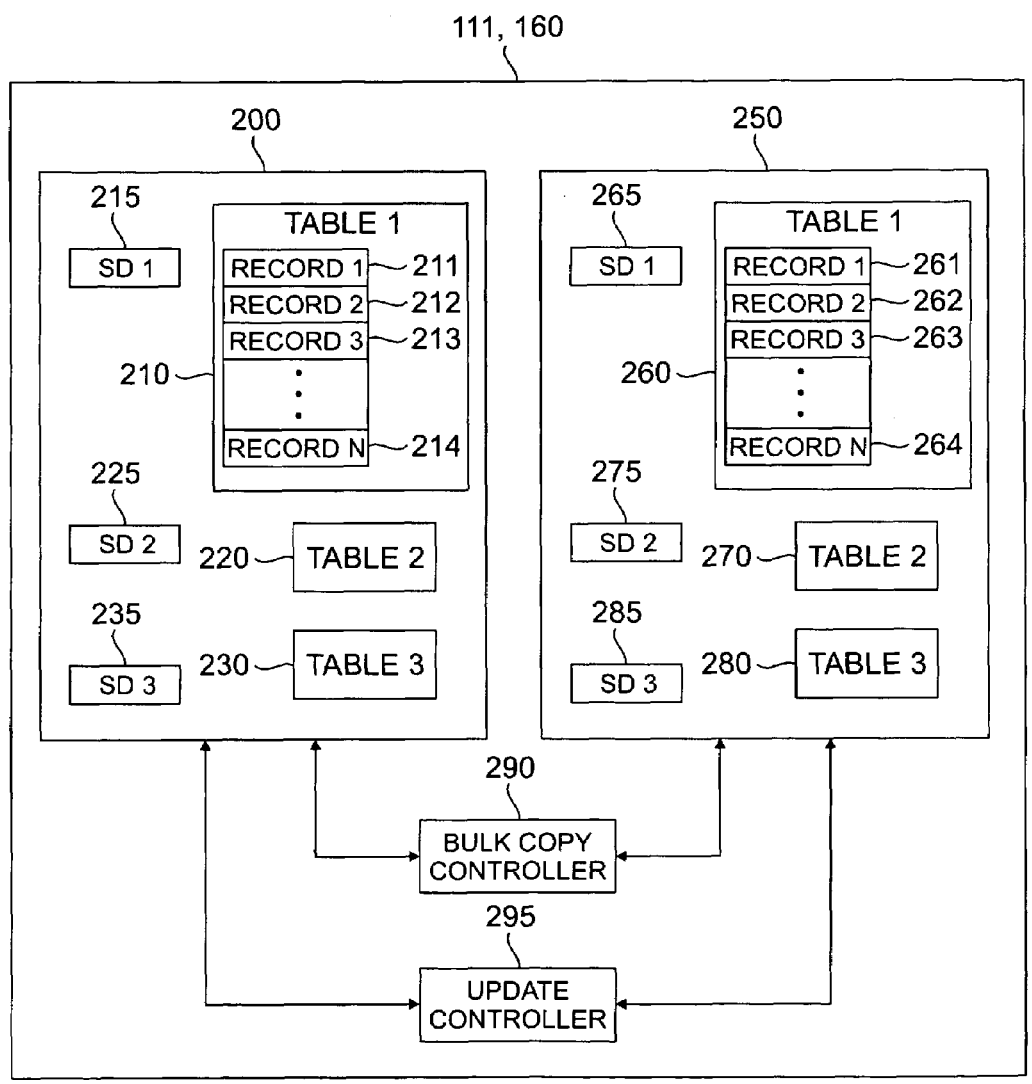
FIG. 2 illustrates a redundant data processing architecture that may be implemented in the exemplary switch and/or the exemplary base station shown in FIG. 1 according to one embodiment of the present invention.
Figure 3:
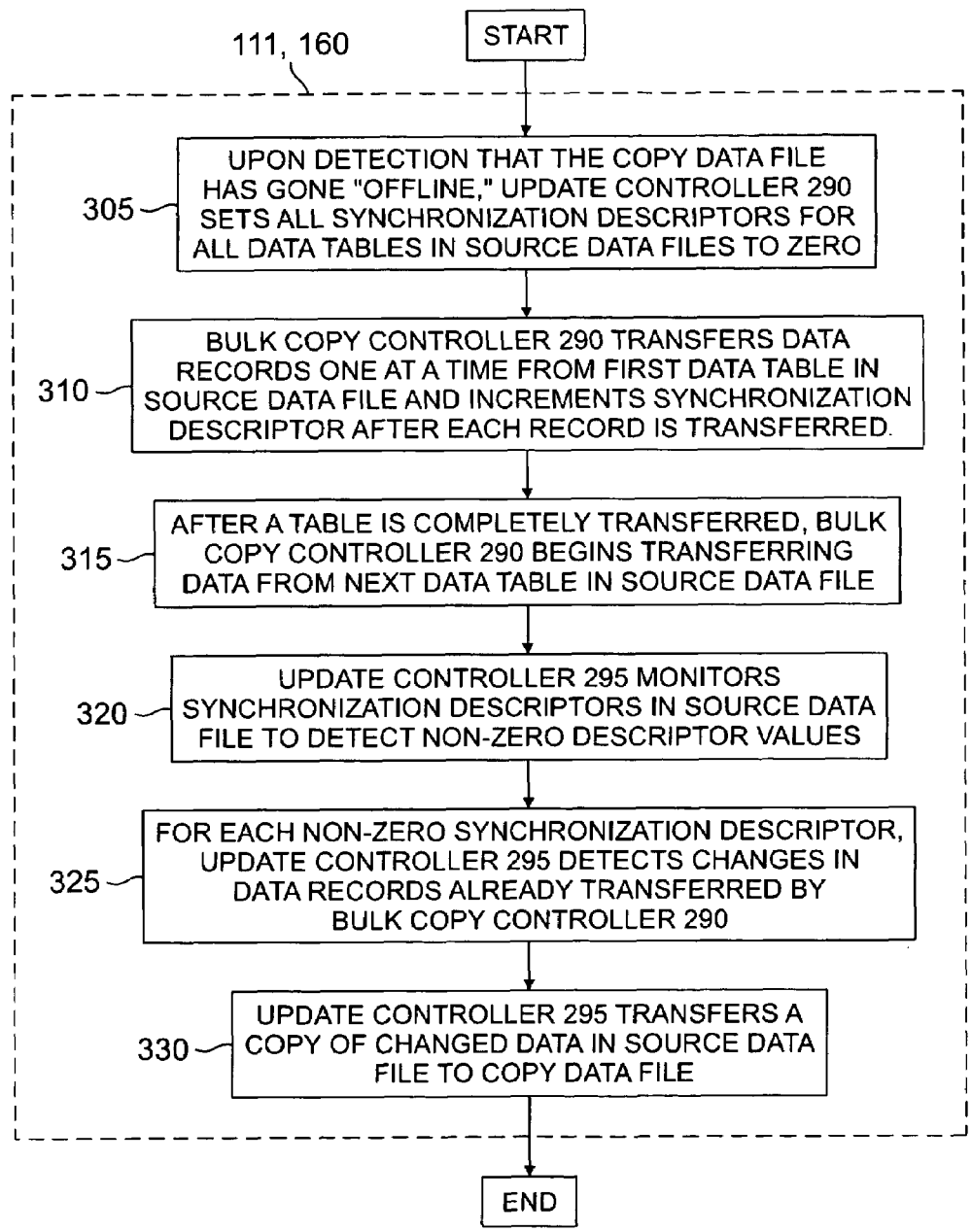
FIG. 3 is a flow diagram illustrating the operation of the bulk copy controller and the update controller in the exemplary switch and/or the exemplary base station in FIG. 1 according to one embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged redundant data processing system.

Although the description that follows is based upon data synchronization for switching systems and base stations with redundant processing systems, memory, and data files, those skilled in the art will also understand that the present invention may be implemented in any suitably arranged system which requires synchronization between redundant copies of one or more data files.

FIG. 1 illustrates exemplary communication network 100 containing switches 111–114 in accordance with the principles of the present invention. Communication network 100 comprises a subnetwork 105, indicated by a dotted line, comprising switches 111–114, that interconnects end-user devices 131–134 with each other and with other switches (not shown) and other end-user devices (not shown) associated with communication network 100. Switches 111–114 are interconnected by data links 121–126. Subnetwork 105 is intended to be a representative portion of communication network 100, which may contain many other switches similar to switches 111–114. Communication network 100 may also comprise wireless equipment, such as base station 160, that enable communication network 100 to communicate with wireless devices, such as cellular telephones and/or computers equipped with cellular modems.

To enhance the reliability of communication network 100, at least some of the components therein, such as switches 111–114 and base station 160, are redundant systems that include a primary (or master) processing system and a secondary (or slave) processing system. The primary processing system may switchover to the secondary processing system upon the occurrence of a failure or upon a system command. In order to properly perform the switchover, however, the backup data in the secondary processing system (called "copy data") must be identical to (or "synchronized" with) the original data (called "source data") in the primary processing system. If the secondary processing system is taken offline for even a short period of time, the data in the source data file and the data in the copy data file quickly lose any resemblance to one another.

This requires that a bulk copy must be performed for all the source data in the primary processing system. Also, if either the primary processing system or the secondary processing system is replaced after a failure occurs, the replacement system must be synchronized as rapidly as possible with the data in the other processing system by means of a bulk copy process. The present invention provides a unique, deterministic method for synchronizing the data in a source data file and the data in a copy data file.

FIG. 2 illustrates a redundant data processing architecture that may be implemented in exemplary switch 111 and/or exemplary base station 160 according to one embodiment of the present invention. Exemplary switch 111 (or base station 160) comprises memory 200, memory 250, bulk copy controller 290, and update controller 295. Memory 200 stores the source (or original) data file used by the primary processing system in switch 111 (or base station 160). Memory 250 stores the copy (or image) data file used by the secondary processing system in switch 111 (or base station 160).

Within memory 200, the source data file comprises exemplary data tables 210, 220, and 230, arbitrarily labeled "Table 1," "Table 2," and "Table 3," respectively, in FIG. 1. Memory 200 also comprises synchronization descriptor 215 (arbitrarily labeled "SD1"), which is associated with data table 210, synchronization descriptor 225 (arbitrarily labeled "SD2"), which is associated with data table 220, and synchronization descriptor 235 (arbitrarily labeled "SD3"), which is associated with data table 230. Each synchronization descriptor is a counter register that provides the synchronization status of its associated data table, where the status is determined by bulk copy controller 290 and update controller 295. In one embodiment, each synchronization descriptor is set to zero to indicate that the data table associated with the synchronization descriptor needs to be copied to memory 250. A synchronization descriptor that is set to a non-zero integer value is an indication that data records with a label equal to or less than the non-zero value must be examined to detect a change (e.g., a data write operation) in the data record. In a case where data records are copied from memory 250 to memory 200, synchronization descriptors 215, 225, and 235 may reflect a standby, neutral, or don't care state.

Within memory 250, the data file comprises exemplary data tables 260, 270, and 280, arbitrarily labeled "Table 1," "Table 2," and "Table 3," respectively, in FIG. 2. Memory 250 also comprises synchronization descriptor 265 (arbitrarily labeled "SD 1"), which is associated with data table 260, synchronization descriptor 275 (arbitrarily labeled "SD 2"), which is associated with data table 270, and synchronization descriptor 285 (arbitrarily labeled "SD 3"), which is associated with data table 280. Synchronization descriptors 265, 275, and 285 of memory 250 may be in a standby, neutral, or don't care state when source data records are being copied from memory 200 to memory 250. However, in the event of a change in the direction of data record copy transfer, synchronization descriptors 265, 275, and 285 function as previously described for synchronization descriptors 215, 225, and 235 in memory 200.

Data table 210 comprises a plurality of data records 211 through 214 (arbitrarily labeled "Record 1" through "Record N", respectively) which store source data records. Similarly, data table 260 comprises a plurality of copy data records 261 through 264 (arbitrarily labeled "Record 1" through "Record N"), with each data record in memory 250 respectively storing a copy of the equivalent source data record in memory 210. In other words, Record 1 in data table 210 is copied over to Record 1 in data table 260, Record 2 in data table 210 is copied over to Record 2 in data table 260, and so on.

Bulk copy controller 290 controls the bulk copy of data records from memory 200 to memory 250, when enabled. In one embodiment, bulk copy controller 290 may begin the bulk copy of data records in data tables 210, 225, and 235 when synchronization descriptors 215, 225, and 235 are all zero. In another embodiment, bulk copy controller 290 may begin the bulk copy of source data records when bulk copy controller 290 indirectly receives a bulk copy request from update controller 295 through memory 200. After each source data record is copied to memory 250, bulk copy controller 290 may increment the status of the synchronization descriptor associated with the copied data record as an indication that update controller 295 may begin to monitor the source data records for changes. Bulk copy controller 290 continues to copy source data records and to increment synchronization descriptors until all source data records have been copied from memory 200 to memory 250. When the bulk copy process is complete, synchronization descriptors 215, 225, and 235 reflect their highest numbered source data record.

When data is required to be copied from memory 250 to memory 200, bulk copy controller 290 may perform the same functions as described above, although the data and synchronization descriptors of memory 250 are now controlled and monitored.

Update controller 295 may initiate the bulk transfer of source data to memory 250 and may provide updates for changed source data records after the initial copy transfer of a particular data record. As previously described, update controller 295 may set synchronization descriptors 215, 225, and 235 to zero when update controller 295 determines that memory 250 is offline or otherwise requires the bulk copy of source data records from memory 200. As long as synchronization descriptors 215, 225, and 235 are zeroes, update controller 295 provides no data record update for memory 250. As synchronization descriptors are incremented from zero to a non-zero value, update controller 295 monitors the associated source data record(s) to detect write operations that change data in source data records that are less than or equal to the value of SD1, SD2, or SD3. Update controller 295 increases the number of monitored source data records by one data record with each increment of a synchronization descriptor by bulk copy controller 290.

At any instant in time, update controller 295 may update a data record with a record number equal to or less than the value of the synchronization descriptor for that table in memory 200. Ultimately, update controller 295 monitors the status of all source data records associated with each source data table 210, 220, and 230 as reflected by the highest numbers on associated synchronization descriptors 215, 225, and 235. In the event that data records are copied from memory 250 to memory 200, update controller 295 provides the same functions as described above for synchronization descriptors and data records located in memory 250 rather than memory 200.

FIG. 3 depicts flow diagram 300, which illustrates the operation of bulk copy controller 290 and update controller 295 in exemplary switch 111 and/or exemplary base station 160 according to one embodiment of the present invention. Typically, a bulk copy process in which all data records from source memory 200 are copied to memory 250 follows a period of time in which memory 250 is not available for update. Upon detecting that the copy data file in memory 250 has gone "offline" and is available to receive a complete or bulk copy of source data files from memory 200, update controller 290 sets synchronization descriptors 215, 225, and 235 for source data tables 210, 220, and 230, respectively, to zeroes (process step 305).

Next, bulk copy controller 290 copies data records one at a time from first source data table 210 to first copy data table 260. After each source data record is transferred, bulk copy controller 290 increments the synchronization descriptor associated with the source data record in memory 200 (process step 310). After a specific source table is completely copied and transferred, bulk copy controller 290 begins copying and transferring data from the next data table in the source data file. Bulk copy controller 290 continues to increment the synchronization descriptor associated with each data record until each source data table in memory 200 has been copied and transferred to the appropriate data table in memory 250 (process step 315).

Operating simultaneously with bulk copy controller 290, update controller 295 monitors source synchronization descriptors in memory 200 for the presence of non-zero synchronization descriptor values (process step 320). Update controller 295 interprets the presence of a non-zero synchronization descriptor as an indication of the highest numbered source data record that may have received new source data since the indicated data record was copied and transferred to memory 250. For each non-zero synchronization descriptor, update controller 295 examines data records less than or equal to the value of the synchronization descriptor for changes with respect to the data record as stored in memory 250 (process step 325). In one embodiment of the present invention, update controller 295 detects changes in the data records of the source data file by detecting data write operations to any data record less than or equal to the value of the synchronization descriptor.

When changed data is found in a previously transferred source data record in memory 200, update controller 295 transfers a copy of the changed data record from memory 200 to the appropriate data record location in memory 250 (process step 330). Byway of example, if SD1=4, then update controller 295 detects write operations in Record 1 through Record 4 in data table 210 and copies the changed data to Record 1 through Record 4 in data table 260. When the bulk copy process is first initiated, update controller 295 has no data to examine for change since new source data has not been transferred to copy memory 250, as indicated by the zero value in all synchronization descriptors in memory 200. However, the number of data records examined by update controller 295 increases with each data record copied and transferred by bulk copy controller 290.

Once the bulk copy and transfer of all source data records is complete, bulk copy controller 290 examines memory 200 for all zero values in the synchronization descriptors in memory 200. Simultaneously, update controller 295 continuously examines data records in memory 200 for changes and copies changed data records to memory 200, while also determining if the updating process needs to stop (other side offline) and then detecting when a bulk copy process can be performed (other side back online).

Although the present invention has been described in detail, those skilled in the art should understand that they can make various changes, substitutions and alterations herein without departing from the spirit and scope of the invention in its broadest form.

What is claimed is:

1. A data synchronization apparatus for maintaining synchronization between a source data file and a copy data file comprising:
    a bulk copy controller capable of copying a plurality of data records from said source data file to said copy data file during a first copy operation; and
    an update controller capable of detecting a change in a data record previously copied by said bulk copy controller from said source data file to said copy data file during said first copy operation and copying said changed data record from said source data file to said copy data file, wherein said update controller copies said changed data record while said bulk copy controller is performing said first copy operation.

2. The data synchronization apparatus set forth in claim 1 wherein said source data file comprises at least one data table comprising a plurality of data records and a synchronization descriptor associated with said at least one data table.

3. The data synchronization apparatus set forth in claim 2 wherein said bulk copy controller sequentially copies said plurality of data records in said at least one data table in said source data file to said copy data file and sets said synchronization descriptor to an index value of a most recently copied one of said plurality of data records.

4. The data synchronization apparatus set forth in claim 3 wherein said update controller detects changes in said plurality of data records in said at least one data table in said source data file by monitoring selected ones of said plurality of data records in said at least one data table in said source data file having an index value less than said index value in said synchronization descriptor.

5. The data synchronization apparatus set forth in claim 4 wherein said update controller detects said changes in said plurality of data records in said at least one data table in said source data file by monitoring data write operations in said plurality of data records in said at least one data table in said source data file.

6. The data synchronization apparatus set forth in claim 5 wherein said update controller is capable of detecting that said copy data file is off line and has lost synchronization with said source data file.

7. The data synchronization apparatus set forth in claim 6 wherein said update controller is capable of determining that said copy data file is on line and is capable of activating said bulk copy controller by setting at least one synchronization descriptor in said source data file to a zero value.

8. A telecommunications device comprising:
    a primary processing system comprising a first memory capable of storing a source data file;
    a secondary processing system comprising a second memory capable of storing a copy data file; and
    a data synchronization apparatus coupled to said first and second memories for maintaining synchronization between said source data file and said copy data file, said data synchronization apparatus comprising:
    a bulk copy controller capable of copying a plurality of data records from said source data file to said copy data file during a first copy operation; and
    an update controller capable of detecting a change in a data record previously copied by said bulk copy controller from said source data file to said copy data file during said first copy operation and copying said changed data record from said source data file to said copy data file, wherein said update controller copies said changed data record while said bulk copy controller is performing said first copy operation.

9. The telecommunications device set forth in claim 8 wherein said source data file comprises at least once data table comprising a plurality of data records and a synchronization descriptor associated with said at least one data table.

10. The telecommunications device set forth in claim 9 wherein said bulk copy controller sequentially copies said plurality of data records in said at least one data table in said source data file to said copy data file and sets said synchronization descriptor to an index value of a most recently copied one of said plurality of data records.

11. The telecommunications device set forth in claim 10 wherein said update controller detects changes in said plurality of data records in said at least one data table in said source data file by monitoring selected ones of said plurality of data records in said at least one data table in said source data file having an index value less than said index value in said synchronization descriptor.

12. The telecommunications device apparatus set forth in claim 11 wherein said update controller detects said changes in said plurality of data records in said at least one data table in said source data file by monitoring data write operations in said plurality of data records in said at least one data table in said source data file.

13. The telecommunications device set forth in claim 12 wherein said update controller is capable of detecting that said copy data file is off line and has lost synchronization with said source data file.

14. The telecommunications device set forth in claim 13 wherein said update controller is capable of determining that said copy data file is on line and is capable of activating said bulk copy controller by setting at least one synchronization descriptor in said source data file to a zero value.

15. A computer-implemented method of maintaining synchronization between a source data file and a copy data file comprising:
    sequentially copying a plurality of data records from the source data file to the copy data file;
    during the step of sequentially copying, detecting a change in a data record previously copied during the step of sequentially copying; and
    copying the changed data record from the source data file to the copy data file, wherein the step of copying the changed data record occurs during the step of sequentially copying.

16. The method as set forth in claim 15 wherein the source data file comprises at least one data table comprising a plurality of data records and a synchronization descriptor associated with the at least one data table.

17. The method as set forth in claim 16 wherein the step of sequentially copying comprises the substeps of:
    sequentially copying the plurality of data records in the at least one data table in the source data file to the copy data file; and setting the synchronization descriptor to an index value of a most recently copied one of the plurality of data records.

18. The method as set forth in claim 17 wherein the step of detecting a change comprises the substep of monitoring selected ones of the plurality of data records in the at least one data table in the source data file having an index value less than the index value in the synchronization descriptor.

19. The method as set forth in claim 18 wherein the step of detecting said changes in said plurality of data records in said at least one data table in said source data file is by monitoring data write operations in said plurality of data records in said at least one data table in said source data file.

20. The method as set forth in claim 19 wherein the step of detecting said changes is capable of detecting that said copy data file is off line and has lost synchronization with said source data file.

21. The method as set forth in claim 20 further comprising the step of determining that said copy data file is on line and is capable of activating a bulk copy controller by setting at least one synchronization descriptor in said source data file to a zero value.

* * * * *